US009760249B2

(12) United States Patent
Beckley et al.

(10) Patent No.: US 9,760,249 B2
(45) Date of Patent: Sep. 12, 2017

(54) SOCIAL COLLABORATIVE MAPPING

(71) Applicant: International Business Machines Corporation, Armonk, NY (US)

(72) Inventors: Kristina Beckley, Carlisle, MA (US); Ayodeji Adesina, Dublin (IE); Marion R. Summerville, Philadelphia, PA (US); Smriti Talwar, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 14/465,009

(22) Filed: Aug. 21, 2014

(65) Prior Publication Data
US 2016/0057180 A1 Feb. 25, 2016

(51) Int. Cl.
G06F 17/30 (2006.01)
G06F 3/0482 (2013.01)
G06Q 30/00 (2012.01)
H04W 4/20 (2009.01)

(52) U.S. Cl.
CPC .......... G06F 3/0482 (2013.01); G06Q 30/00 (2013.01); H04W 4/206 (2013.01)

(58) Field of Classification Search
CPC combination set(s) only.
See application file for complete search history.

(56) References Cited

U.S. PATENT DOCUMENTS

| 7,925,592 | B1* | 4/2011 | Issa ........................ G06F 21/10 705/52 |
| 8,112,384 | B2 | 2/2012 | Mitra et al. |
| 2005/0262081 | A1* | 11/2005 | Newman .......... G06F 17/30994 |
| 2006/0218491 | A1* | 9/2006 | Grossman ............. G06F 17/241 715/243 |
| 2008/0102428 | A1 | 5/2008 | Levy et al. |
| 2010/0162364 | A1* | 6/2010 | Roth ..................... G06F 21/604 726/4 |

(Continued)

OTHER PUBLICATIONS

Khan Acadamy, "USe Khan Academy to practice your math skills," downloaded from <https://www.khanacademy.org/exercisedashboard> on Aug. 21, 2014, (C) 2014.

(Continued)

Primary Examiner — Etienne LeRoux
(74) Attorney, Agent, or Firm — Gates & Cooper LLP

(57) ABSTRACT

Provided are techniques for the modification of social collaborative maps that include processors; a computer-readable storage medium (CRSM); a concept map stored on the CRSM, the concept map comprising a plurality of nodes; a plurality of connections between the plurality of nodes; and a plurality of social network connections, wherein each node of the plurality of nodes is coupled to a corresponding subset of the plurality of social network connections; and logic, stored on the CRSM and executed on the plurality of processors, for providing a user interface to provide a user access to the plurality of nodes and to the plurality of social network connections; collecting data corresponding to navigation of the user of the plurality of nodes and interaction by the user with the plurality of social network connections; analyzing the data and modifying, based upon the analyzing, the concept map to generate a modified concept map.

20 Claims, 8 Drawing Sheets

(56) References Cited

U.S. PATENT DOCUMENTS

2011/0040789 A1* 2/2011 Furusawa ......... G06F 17/30864
                                                      707/780
2012/0042263 A1   2/2012 Rapaport et al.
2012/0131445 A1* 5/2012 Oyarzabal ............. G06F 17/211
                                                      715/235

OTHER PUBLICATIONS

Novak et al., "THe THeory Underlying Concept Maps and How to Construct and Use Them," Institute for Human and Machine Cognition, Technical report IHMC Cmap Tools Jan. 2006 REv Jan. 2008, downloaded from <http://cmap.ihmc.us/publications/researchpapers/theorycmaps/theoryunderlyingconceptmaps.htm> on Aug. 21, 2014; Jan. 2008.

* cited by examiner

SOCIAL COLLABORATIVE MAPPING

FIELD OF DISCLOSURE

The claimed subject matter relates generally to social collaborative mapping and, more specifically, to a comprehensive social presence approach to learning management through concept mapping.

BACKGROUND OF THE INVENTION

In a structured learning setting, curriculum/course design is used to formulate guidelines for assessing learners' progress and also to give learner an understanding of what is required in order to obtain a certain certification/qualification. One of the significant characteristics of such design is that it is not static but rather constantly re evaluated and changed to meet changing needs and demands. Today, many online learning systems are delivering online versions of very traditionally structured courses with some tacked on social interactions meant to mimic a traditional classroom experience. Consequently, there has been a significant increase in the amount of learning now taking place in online environments. This phenomenon has also increased expectations for the incorporation of social and collaborative elements in compelling visual user experiences. In recent years, graphical techniques—concept maps in particular—are increasingly being used to develop and deliver online curricula and courses. Also, significant efforts have and are been made to advance the use of concept mapping techniques for educational purposes.

SUMMARY

Provided are techniques for leveraging a combination of concept mapping, social learning/interactions and the resulting learning analytics+social analytics to create a uniquely inviting, touchable, moveable, dynamically changing and expanding social interactive learning environment.

This new system may benefit learners, content creators and learning managers. Leveraging analytics across all facets using the structure provided by the concept map, informs the learning environment managers as well as enhances, personalizes and improves the individual and aggregate learner experience. Formal content, ad hoc content, questions, people and patterns may all come together through the use of data mining technique on interactions and activities taken place on every node. By extending the current static state of concept mapping nodes with more actively engaging social presence and collaborations capabilities, social cunstructivism which emphasizes learner exploration and discovery through collaborative efforts is enhanced. Overall, by bringing the concept map structures/elements to life, the claimed subject matter enhances social interactions, learning analytics; and, improve the ability to utilize, access and capture social content for reuse. Consequently, learning outcome is improved and self-efficacy can be enhanced as congruency occurred while significant degree of learner's control is maintained. Also, by allowing individual learner to contribute to the creation of nodes, each learner may form their own representation of knowledge, building on their individual experiences through exploration. This may be significant as most learning occur when learner's exploration uncovers an inconsistency between their current knowledge representation and the outcome of their exploration. Social content analytics, enabled within our disclosed subject matter, inform revision, refinement and expansion of the concept map scaffold over time and to adapt to more personalized usage.

Provided are techniques for the modification of social collaborative maps that include a plurality of processors; a non-transitory computer-readable storage medium (CRSM) coupled to the plurality of processors; a concept map stored on the CRSM, the concept map comprising a plurality of nodes ($N_1$-$Nn$); a plurality of connections ($C_1$-$C_M$) between the plurality of nodes; and a plurality of social network connections, wherein each node of the plurality of nodes is coupled to a corresponding subset of the plurality of social network connections; and logic, stored on the CRSM and executed on the plurality of processors, for providing a user interface to provide a user access to the plurality of nodes and to the plurality of social network connections; collecting data corresponding to navigation of the user of the plurality of nodes and interaction by the user with the plurality of social network connections; analyzing the data; and modifying, based upon the analyzing, the concept map to generate a modified concept map.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
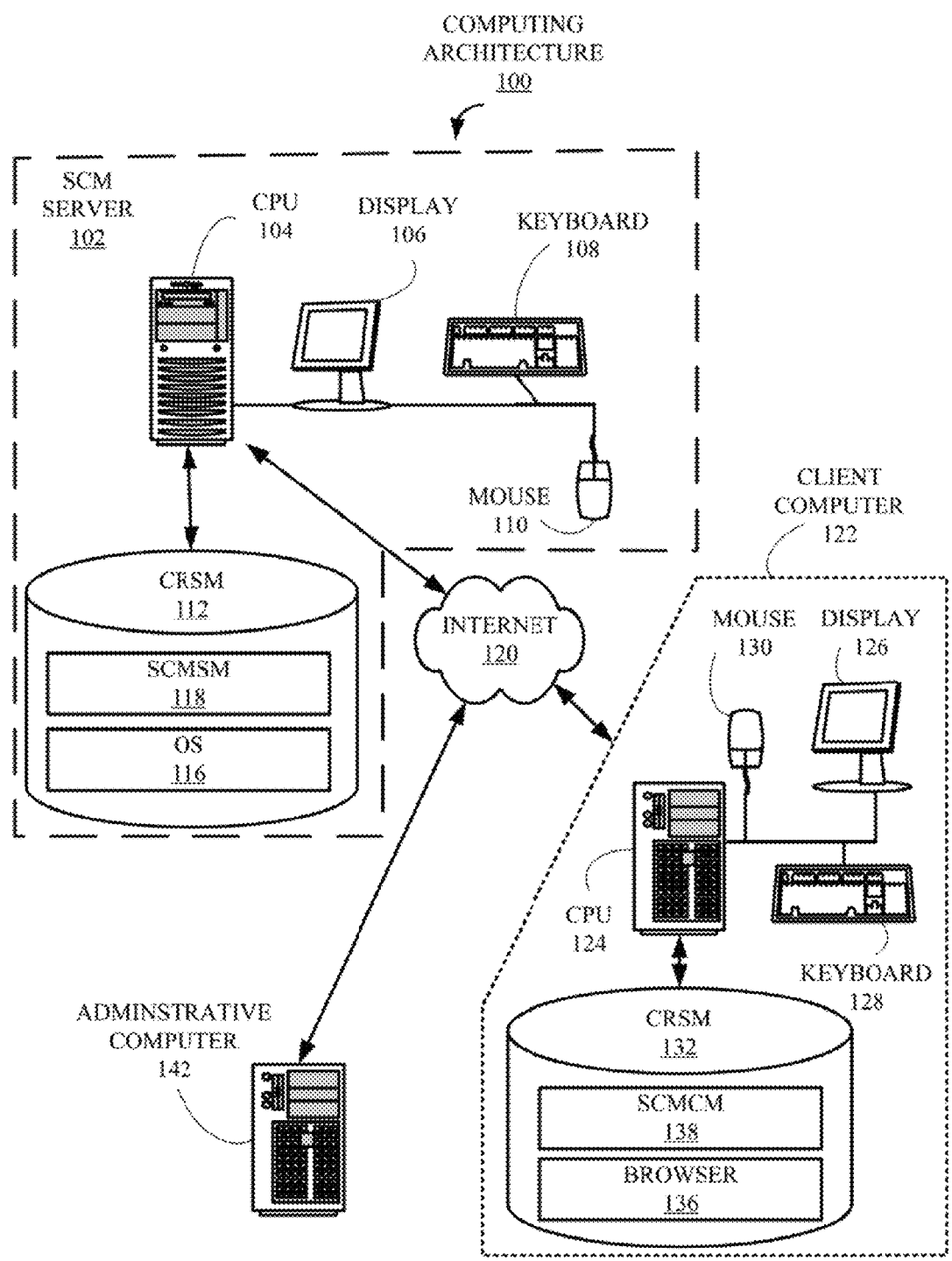
FIG. 1 is a block diagram of a computing architecture that may implement a Social Collaborative Mapping (SCM) techniques of the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented, programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In general, a concept map can be a diagram that shows relationships between concepts. More specifically, a concept map can be a computer implemented and displayed graphical tool that students, designers, engineers, technical writers, and others use to organize and structure knowledge by providing "clickable" links between related concepts associated with as particular subject.

As herein described, the claimed subject matter can solve technical problems related to technical certain fields. Those fields include the technical fields of visual display, image display, social media technology, and interactive learning that implements visual tools. The claimed subject matter can accomplish this by facilitating the improvement of concept maps by improving a computer's functionality, execution and operation with respect to concept maps. Specifically, social media interaction and user interaction with a concept map are monitored and "mined" for patterns that may improve a concept map's relevance and efficiency, thus improving processing speed and memory usage. Further, improvements to functionality, operation and execution of concept maps provide an advancement in the technology of on-line learning systems, a field that is currently growing and is expected to continue growing in importance.

Turning now to the figures. FIG. 1 is a block diagram of a computing architecture 100 on which the claimed subject matter, including a Social Collaborative Mapping (SCM) architecture (see FIG. 6) a may be implemented. A SCM server, or simply "server," 102 includes a central processing unit (CPU) 104 coupled to a display 106, a keyboard 108 and a pointing, device, or "mouse," 110, which together facilitate human interaction with elements of server 102 and computing architecture 100. Also included with server 102 and attached to CPU 104 is a computer-readable storage medium (CRSM) 112, which may either be incorporated into server 102 i.e. an internal device, or attached externally to CPU 104 by means of various, commonly available connection devices such as but not limited to, a universal serial bus (USB) port (not shown). CRSM 112 is illustrated storing an operating system (OS) 116 and a SCM server module (SCMSM) 118 that incorporates aspects of the claimed subject matter. SCMSM 118 is explained in more detail below in conjunction with FIGS. 2-8.

Server 102 is communicatively coupled to the Internet 120, which provides access to a client computer 122. Like server 102, client computer 122 includes a CPU 124, a display 126, a keyboard 128 and a mouse 130 and is communicatively coupled to a CRSM 132. Stored on CRSM 132 is an application for accessing resources via internet 120, or a browser 136, and a SCM client module (SCMCM) 138. SCMCM 138 is explained in more detail below in conjunction with FIGS. 2-8.

Also couple to the internet 120 is an administrative computer 142. Like server 102 and client computer 122, administrative computer 142 would include a CPU, display, keyboard, mouse and CRSM, although, for the sake of simplicity, these are not shown.

Although in this example, server 102, client computer 122 and administrative server 142 are communicatively coupled via the Internet 120, they could also be coupled through any number of communication mediums such as, but not limited to, a local area network (LAN) (not shown). Further, it should be noted there are many possible SCM architecture configurations, of which architecture 100 is only one simple example.

Figure 2:
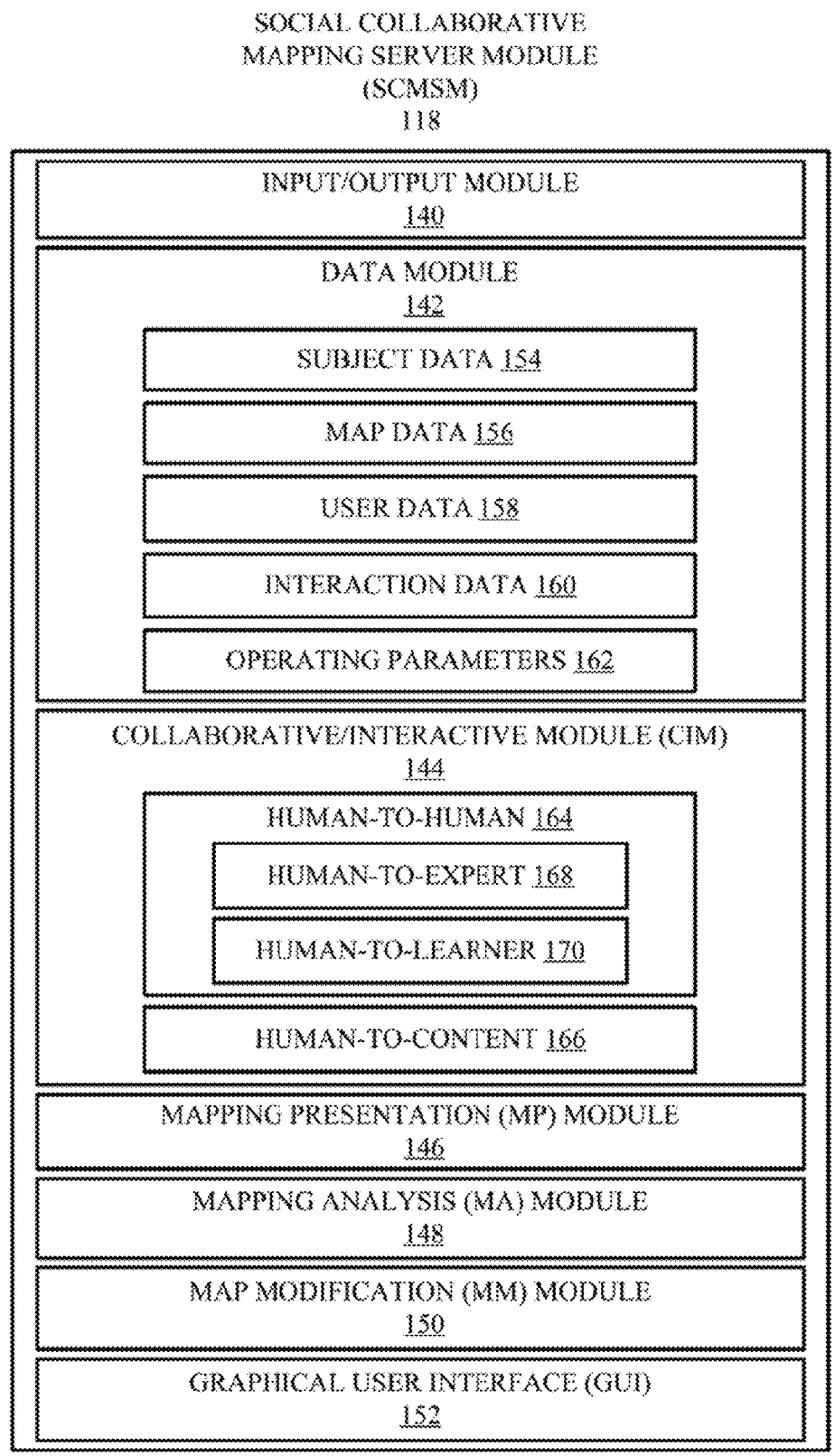
FIG. 2 is a block diagram a SCM server module (SC-MSM) that may implement aspects of the claimed subject matter.

FIG. 2 is a block diagram SCM server module (SCMSM) 118, first introduced above in conjunction with FIG. 1, in more detail. SCMSM 118 includes an input/output (I/O) module 140, a data module 142, a collaborative/interactive module (CIM) 144, a mapping presentation (MP) module 146, an mapping analysis (MA) module 148, a map modification (MM) module 150 and a graphical use interface module, or simply "GUI," 152. For the sake of the following examples, logic associated with SCMSM 118 is assumed to be stored on CRSM 112 (FIG. 1) execute on one or more processors (not shown) of CPU 104 (FIG. 1) of server 102 (FIG. 1). It should be understood that the claimed subject matter can be implemented in many types of computing systems and data storage structures but, for the sake of simplicity, is described only in terms of server 102 and architecture 100 (FIG. 1). Further, the representation of SCMSM 118 in FIG. 2 is a logical model. In other words, components 140, 142, 144, 146, 148, 150 and 152 may be stored in the same or separates files and loaded and/or executed within architecture 100 either as a single system or as separate processes interacting via any available inter process communication (IPC) techniques.

I/O module 140 handles any communication SCMSM 118 has with other components of server 102 and architecture 100. Data module 142 is a data repository for information that SCMSM 118 requires during normal operation. Examples of the types of information stored in data module 142 include subject data 154, map data 156, user data 158, interaction data 160 and operating parameters 162. Subject data 154 stores information on different subject matter that may be presented in conjunction with the claimed subject matter. In the alternative, subject data 154 may simply reference, or point to, other sources for such data. For example, information on a course in Earth Sciences may be located on one or more servers (not shown) specifically designated for that subject.

Map data 156 stores information on social collaborative maps (see FIG. 4) that may be employed in conjunction with subjects stored in subject data 154. User data 158 stores information on different users of SCMSM 118, including but not limited to, students, teachers and other users and administrators of SCMSM 118. Interaction data 160 is a record of the manner in which maps stored in map data 156 have been used and navigated by users. Operating parameters 162 includes information on various user and administrative preferences that have been set. For example, an administrator may set thresholds for levels of interaction that trigger automatic modifications to maps references in map data 156 or a user may specify various display option such as the particular analytic information displayed to users (see FIG. 5). In short, operating parameters 162 stores information that controls the manner in which SCMSM 118 operates.

Figure 4:
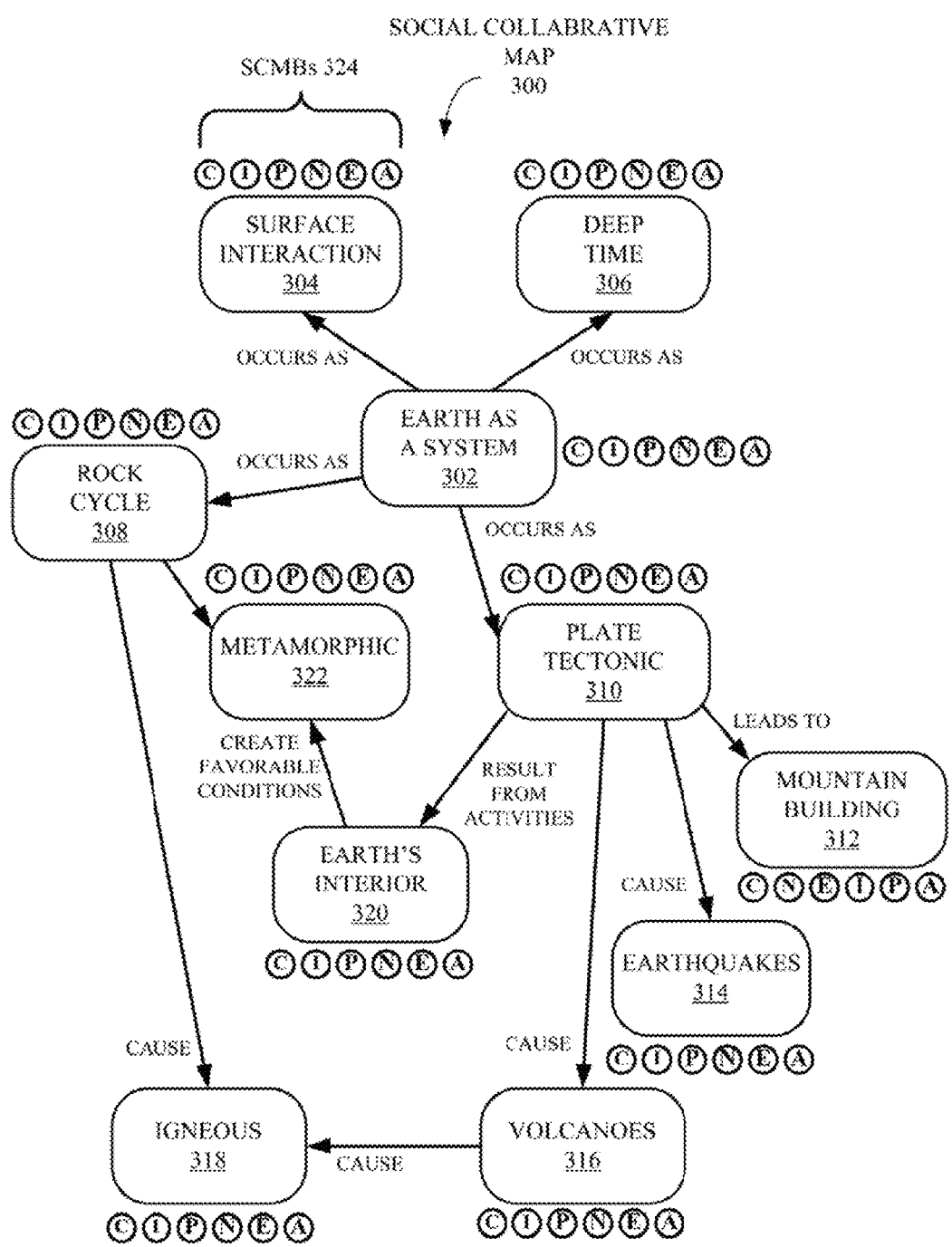
FIG. 4 is an illustration of a concept map, or SCM map, that may be maintained, displayed and modified in accordance with the claimed subject matter.

CIM 144 is responsible for the collection of data and statistics related to user and administrative interaction with concept maps, including the use of various social collaboration tools provided with the nodes of a concept map (see 300, 304, 324; FIG. 4). CIM 144 collects and stores data relating to different types of user interactions, including, human-to-human 164 and human-to-content 166. Human-W-human 164 includes interaction such as human-to-expert 168 and human-to-learner 170. Examples of analytic information collected and analyzed in accordance with the disclosed technology are provided and explained in more detail below in conjunction with FIGS. 5-8.

MP module 146 is responsible for providing the context and look of interactions with SCMSM 118 (see FIG. 3) by various users. MA module 148 analyses user interaction with concept maps displayed in accordance with the claimed subject matter. In other words, MA module 148 determines the timing and nature of modifications to concept maps. MM module 150 is responsible for actual modifications to maps in map data 156 when determined necessary by MA module 148.

GUI 162 enables users and administrators of SCMSM 118 to interact with and to define the desired functionality of SCMSM 118, typically be setting variables in operating parameters 162. Components 142, 144, 146, 148, 150, 152, 154, 156, 158, 160, 162, 164, 166, 168 and 170 are described in more detail below in conjunction with FIGS. 3-8.

Figure 3:
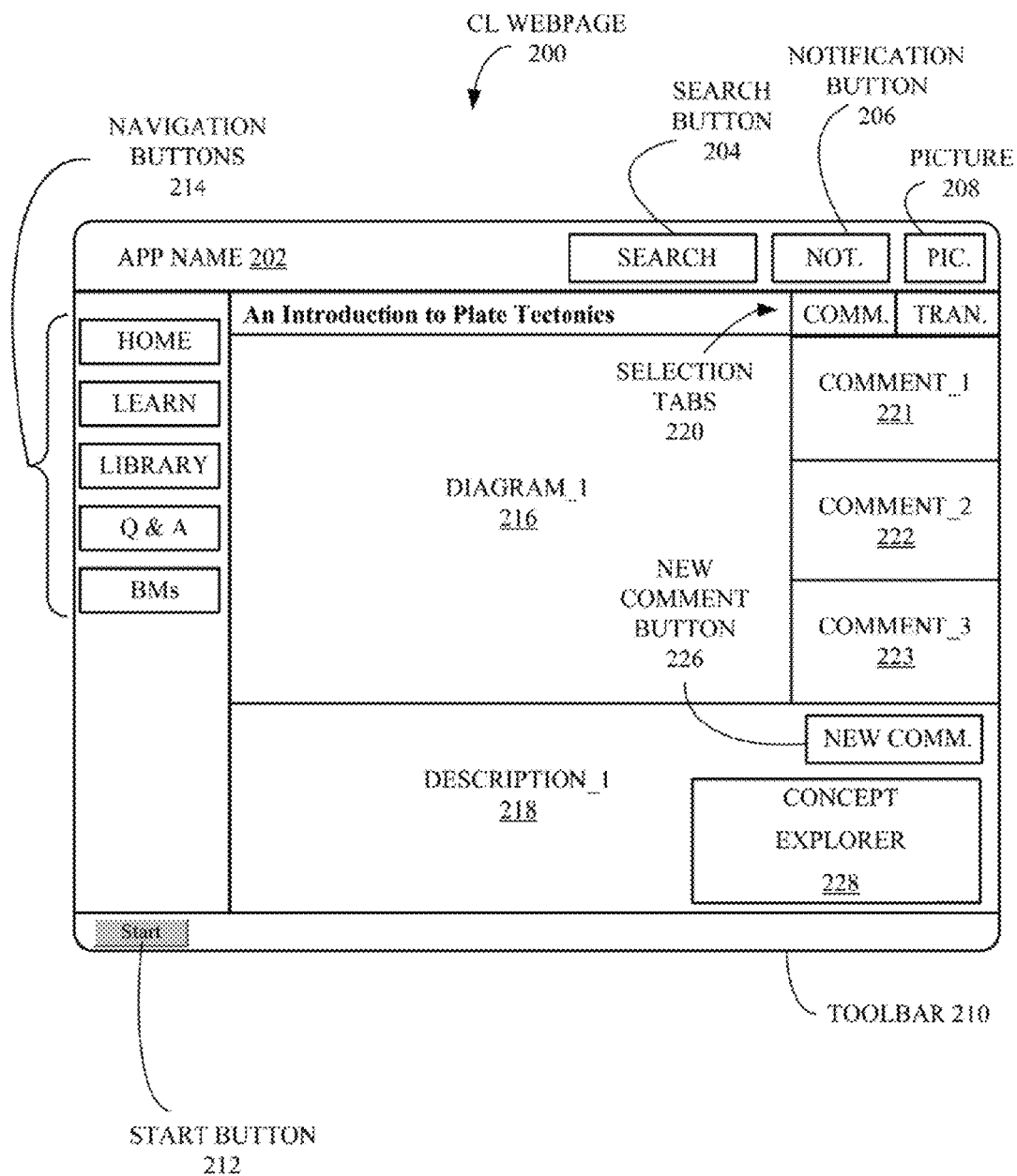
FIG. 3 is an illustration of a collaborative learning (CL) webpage that may be used in conjunction with the claimed subject matter.

FIG. 3 is an example of a collaborative learning (CL) webpage 200 that may be employed in conjunction with the claimed subject matter. In this example, webpage 200 is generated by browser 136 (FIG. 1), which is in communication with SCMSM 118 (FIGS. 1 and 2) via SCMCM 138 (FIG. 1) and displayed on display 126 of client computer 122 (FIG. 1). Webpage 200 includes some standard webpage features, including a name of the application running, the webpage, to "App Name" 202, a search button, 204, a notification button 206, a picture of the user, or Pic. 208 and a toolbar 210, which includes a Start button 212. Also included in webpage 200 are several navigation buttons 214, which include a "Home" button, which corresponds to the current material in webpage 200, a "Learn" button, a "Library" button, a "Question & Answer" (Q&A) button and a "Bookmarks" (BMs) button. Buttons 214 enable a user to display different aspects of webpage 200.

Within webpage 200 is a diagram, to diagram_1 216, which in this example is entitled "An Introduction to Plate Tectonics." The specific diagram is typically related to the particular subject (see 152, FIG. 2) that is being presented by webpage 200. Below diagram_1 216 is a description of diagram_1 216, which in this case is labeled description_1 218. Adjacent to description_1 216 are two (2) selection tabs 220. Selection tabs 220 enable the user to select views of different types of data associated with webpage 200 in general and, more specifically, diagram_1 216 and description_1 218. In this example, a "Comments" tab is selected and thus a comment_1 221, a comment_2 222 and a comment_3 223 are displayed. Also displayed is a button that enables a user to submit a new comment, i.e., a "New Comment" (Comm.) button 226. Rather than comments 221-223 being displayed the user may select a "Transcript"

tab of selection tabs 220 to display transcripts associated with the material in diagram_1 216 and description_1 218.

Adjacent to description_1 218 is a Concept Explorer button 228. Button 228 enables the user to choose to display a concept map (see Social Collaborative Map 300, FIG. 4) associated with the current subject of webpage 200. The elements illustrated in FIG. 3 are used in the following description of the processes associated with the claimed subject matter.

The specific material display and the layout of webpage 200 is used for illustrative purposes only. It should also be understood that webpages displayed in accordance with the disclosed technology may be different based upon the particular role of the user. For example, a user who is also an administrator may see a list of students logged in or a list of experts associated with a particular node (see 302, 304 . . . , FIG. 4).

FIG. 4 is an illustration of a Social Collaborative Map (SCM), or simply "concept map," 300 that is maintained, displayed and modified in accordance with the claimed subject matter. In this example, concept map 300 would be displayed on display 126 (FIG. 1) of client computer 122 (FIG. 1) by browser 136 (FIG. 1) in conjunction with SCMCM 138 (FIG. 1) and SCMSM 118 (FIG. 1). Concept map 300 would be display in response to the user "clicking on" Concept Explorer button 228 (FIG. 3) of CL webpage 200 (FIG. 3). Each element, or node, of concept map 300 may be a clickable link, i.e., each element, or link, is operable to display related material in elements of CL webpage 200 (FIG. 2). In other words, if a user selects a particular element of concept map, e.g., plate tectonic 310, information corresponding to plate tectonic 310 is displayed in the diagram 216, description 218 and comment fields 221-221 of CL webpage 200. In the manner a user may navigate through concept map 300, displaying the information of interest and following an individually-generated line of inquiry. In this example, concept map 300 corresponds to one particular subject matter in CL webpage 200 (FIG. 2), i.e., "An introduction to Plate Tectonics."

Concept map 300 includes a number of nodes, the central one in this example being an "Earth as System" node 302. A user may click on each node to shift the focus on concept map 300 and to focus on, or "drill into," a particular subject. The use of typical concept maps should be familiar to those with skill in the relevant arts. "Earth as System" may "occur as" surface interaction, deep time, rock cycle and plate tectonics, represented by a "Surface Interaction" node 304, a "Deep Time" node 306, a "Rock Cycle" node 308, and a "Plate Tectonic" node 310, respectively. Plate tectonics 310 may "lead to" mountain building, represented by a "Mountain Building" node 312, and may "cause" earthquakes and volcanoes, represented by a "Earthquakes" node 314 and a "Volcanoes" node 316, respectively. Plate tectonics may also "result from activities" in the earth's interior, represented by an "Earth's interior" node 320. The subject matter of both rock cycle 308 and volcanoes 316 many "cause" igneous rock, represented by a "Igneous" node 318. In a similar fashion, the subject matter covered in both Rock Cycle node 308 and Earth's Interior node 320 may "create favorable conditions" for the formation of metamorphic rock, represented by a "Metamorphic" node 322.

It should be understood, that the elements described so far with respect to FIG. 4, i.e., nodes 392, 304, 306, 308, 319, 312, 314, 316, 318, 320 and 322 the "Nodes"), and the relationships between them are similar to elements and relationships in current concept maps. In addition, concept map 309 includes, in conjunction with each of the illustrated Nodes, a set of SCM buttons (SCMBs) 324. Although each of the Nodes has a set of buttons 324 only those associated with node 304 are labeled and described for the sake of simplicity. Each set of buttons 324 include a "Content" button ('C'), an "Interactive" button ('I'), an "Personalization" button ('P'), a "Notes" button ('N'), an "Expert" button ('E') and an "Analytics" button ('A'). It should be understood that SCMBs 324 are not included in a typical concept map but rather are a novel feature of the disclosed technology.

The 'C' button enables a user to display content associated with the corresponding node. For example, links to reference material may be displayed. The 'I' button enables a user to communicate with other users with respect to the corresponding node. For example, social presence and collaborative capabilities that enable the current user to initiate or join chat sessions with other users may be provided. The 'P' button enables a user to personalize the corresponding button. For example, a user may be able to define and add their own node into the concept map. The 'N' button enables a user to record a note corresponding to the corresponding node. Such notes may be either personal to the user or added to a list or notes from other users. In this manner, the user may read what other users have commented on with respect to the corresponding node. The 'E' button enables a user to communicate with an expert in the subject corresponding to the corresponding node. Such communication may take the form of but is not limited to, interactive chats, emails or even a telephone number or other contact information. Finally, the 'A' button enables a user to display information relating to analytics corresponding to the corresponding node, collected in accordance with the claimed subject matter (see FIG. 5).

Figure 5:
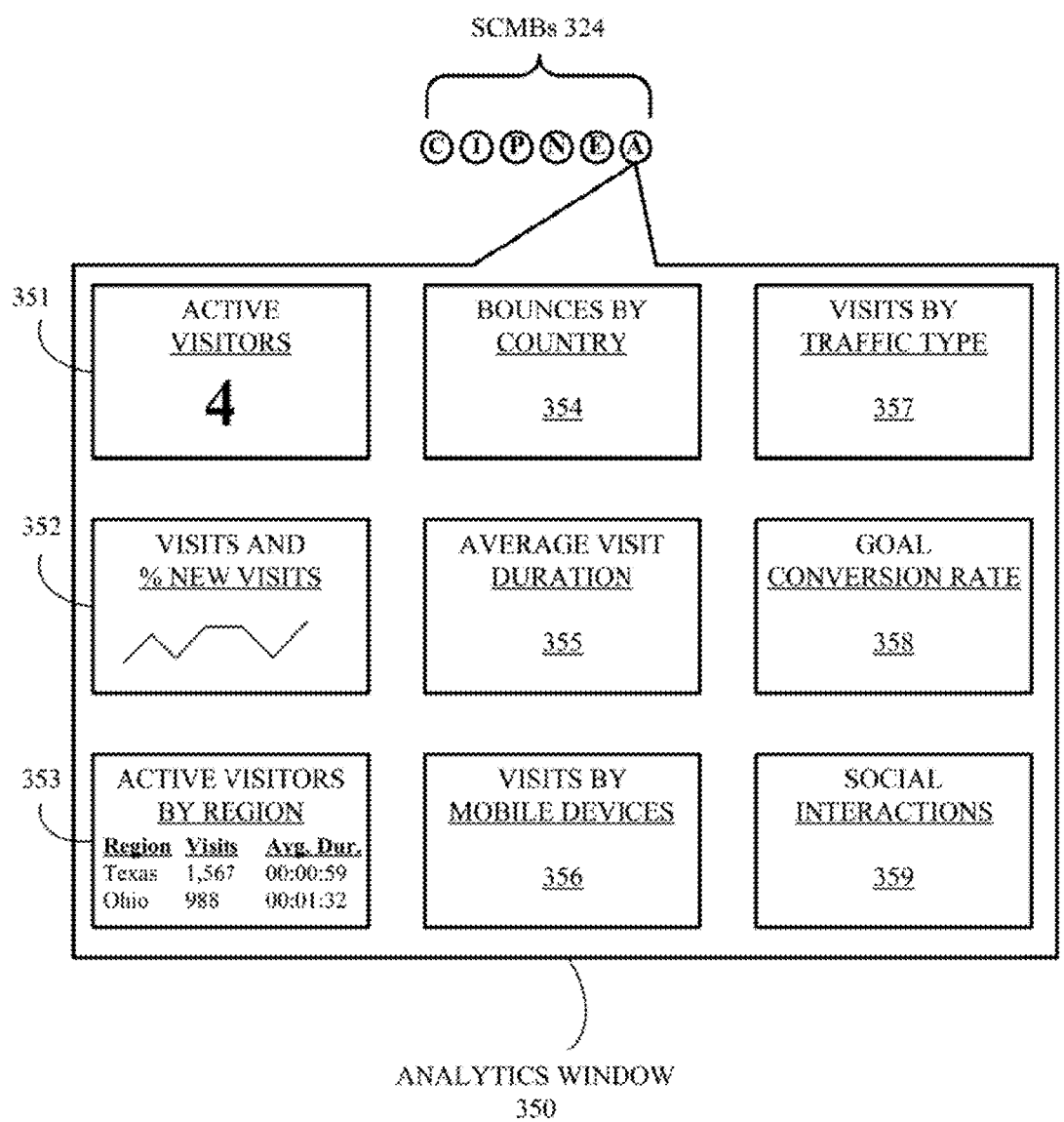
FIG. 5 is an illustration of an "Analytics" pop down window that may be employed to display information related to elements of the concept map introduced in FIG. 4.

FIG. 5 is an illustration of an "Analytics" pop down window 350 that may be employed to display information related to elements of concept map 300 introduced in FIG. 4. In this example, analytics window 350 is displayed when a user clicks on the 'A' button of SCMBs 324 (FIG. 4). It should be understood that a pop down window may also be displayed in conjunction with the 'C', 'I', 'P', 'N' and 'E' buttons of SCMBs 324, each of which would display information relevant to the corresponding node, which in this example is Surface Interaction 304 (FIG. 4) and the particular button that had been selected as explained above in conjunction with FIG. 4.

In this example, analytics window 350 displays a variety of information, in numeric, text and graphical form. The number of active visitors, i.e., "4", on the website, which in this example is CL webpage 200 (FIG. 3), is displayed in an "Active Visitors" box 351. A graph showing the percent of new visits to repeat visit over time is displayed in a "Visits and % New Visits" box 352. A chart showing the visits and average visits by region is displayed in a box 353. Bounces by country information, is displayed in a box 354. Average visit duration information is displayed in a box 355. Visits by mobile device information is displayed in a box 356. Visits by traffic type information is displayed in a box 357. Goal conversion rate information is displayed in a box 358. Finally, social interactions information is displayed in a box 359.

It should be understood that the particular information shown in analytics window 350 and boxes 351-359 are for the purposes of illustration only. Many other types of information may be collected, analyzed and displayed in conjunction with the disclosed technology. In addition, different information and types of information may be displayed based upon the identity and/or role of the user. For example, students, administrators, educators and experts that employ the disclosed technology may each have specific information available.

Figure 6:
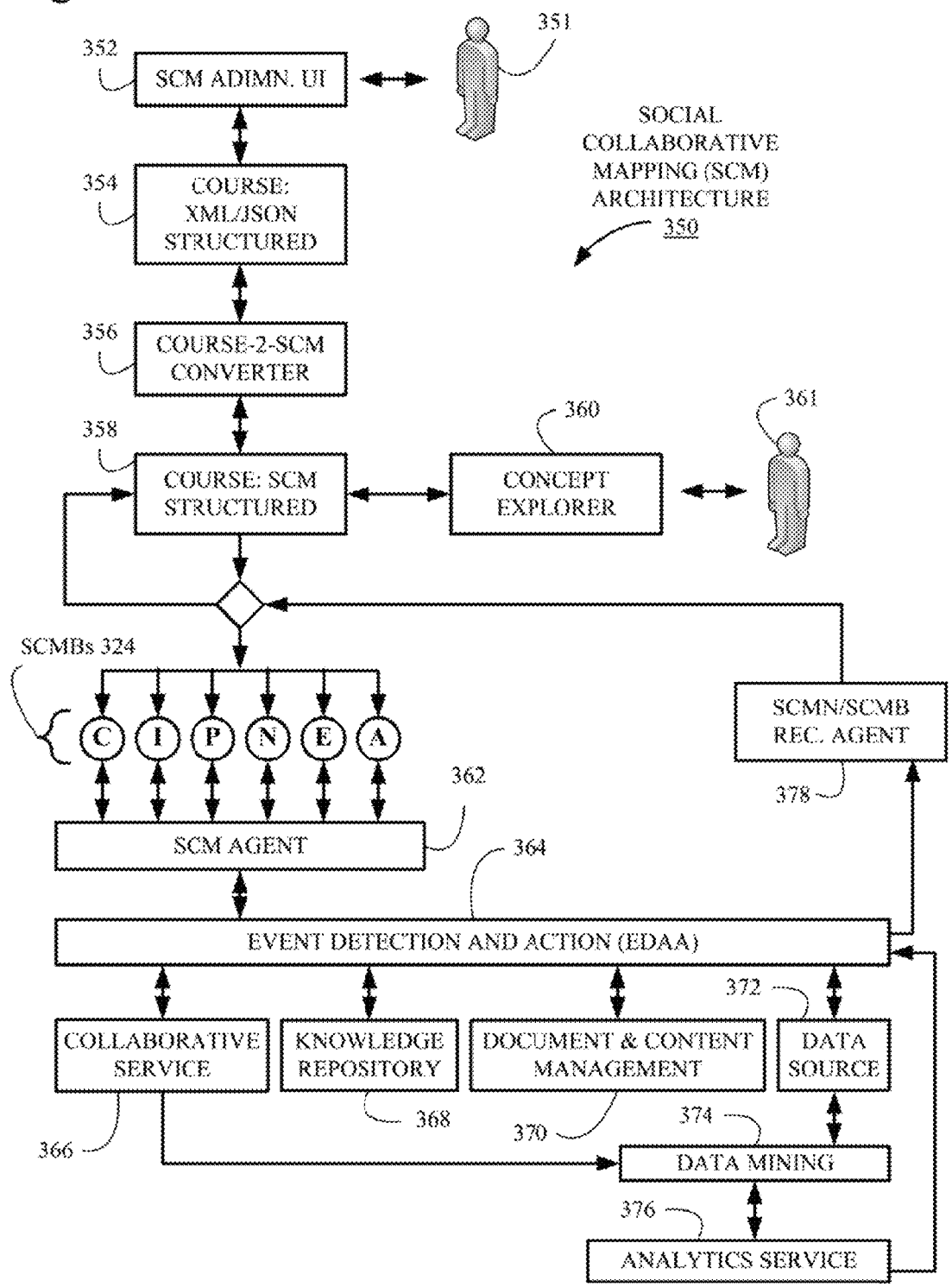
FIG. 6 is a block diagram of a Social Collaborative Mapping (SCM) architecture that may implement the claimed subject matter.

FIG. 6 is a block diagram of a Social Collaborative Mapping (SCM) architecture 350 that may implement the claimed subject matter, more specifically the processing of SCMBs 324 (FIGS. 4 and 5) and navigation of concept pap 300. SCM architecture 350 is executed on various elements of computing architecture 100 (FIG. 1). In this example a, an administrator 351 interacts with SCM architecture 350 via a SCM Administration user interface (Admin. UI) 352 (see SCMSM, FIGS. 1 and 2 and GUI 152, FIG. 2). Administrator 351 may develop course material using eXtended Markup Language (XML) or JavaScript Object Notation (JSON), represented here as Course: XML/JSON Structured 354. Course 354 is processed by a Course-2-SCM converter 356 to produce a Course: SCM structured 358. A user 361 may then access course 358 via a Concept Explorer 360 (see 200, FIG. 3).

User 361 requests for SCMBs 324 are processed by a SCM agent 362, which transmits the request to an Event Detection and Action module (EDAA) 364. Although not illustrated ADAA 364 would also be responsible for processing typical navigation requests. EDAA 364 is responsible for both forwarding the request to an appropriate agent for processing and for collecting information about the request to employ in conjunction with the disclosed technology. EDAA 364 parses the request with respect to required actions and information about the request and, depending upon the particular request, passes the request to one or more of Collaborative Services 366, Knowledge repository 368, Document & Content Management 370 and Data Source 372. Collaborative Service 366 is responsible for handling request for online chats and dialog with experts. Knowledge repository 368 stores metadata concerning the request (see 164, 166, 168 and 170, FIG. 2). Document & Content Management 370 provides stored documents and other content relevant to the request. Data source 372 provides access to other data sources that may be need to satisfy a particular request.

A Data Mining module 374 takes information from collaborative services 366 and data source 372 is look for patterns of use with respect to course 358. An Analytics service 376 analyses the patterns detected by data mining 374 and passes the results to EDAA 364 where the results are processed as another event. If necessary, EDAA 364 transmits information to a social collaborative mapping node/social collaborative mapping button recommendation agent (SCMN/SCMB Rec. Agent) 378, which may affect changes to course 358 in accordance with the claimed subject matter. In this manner, user patterns may be employed to automatically revise and update course 358. In addition, potential changes may be suggested by a crowd sourcing analysis of the data or by an administrative review of the data.

Figure 7:
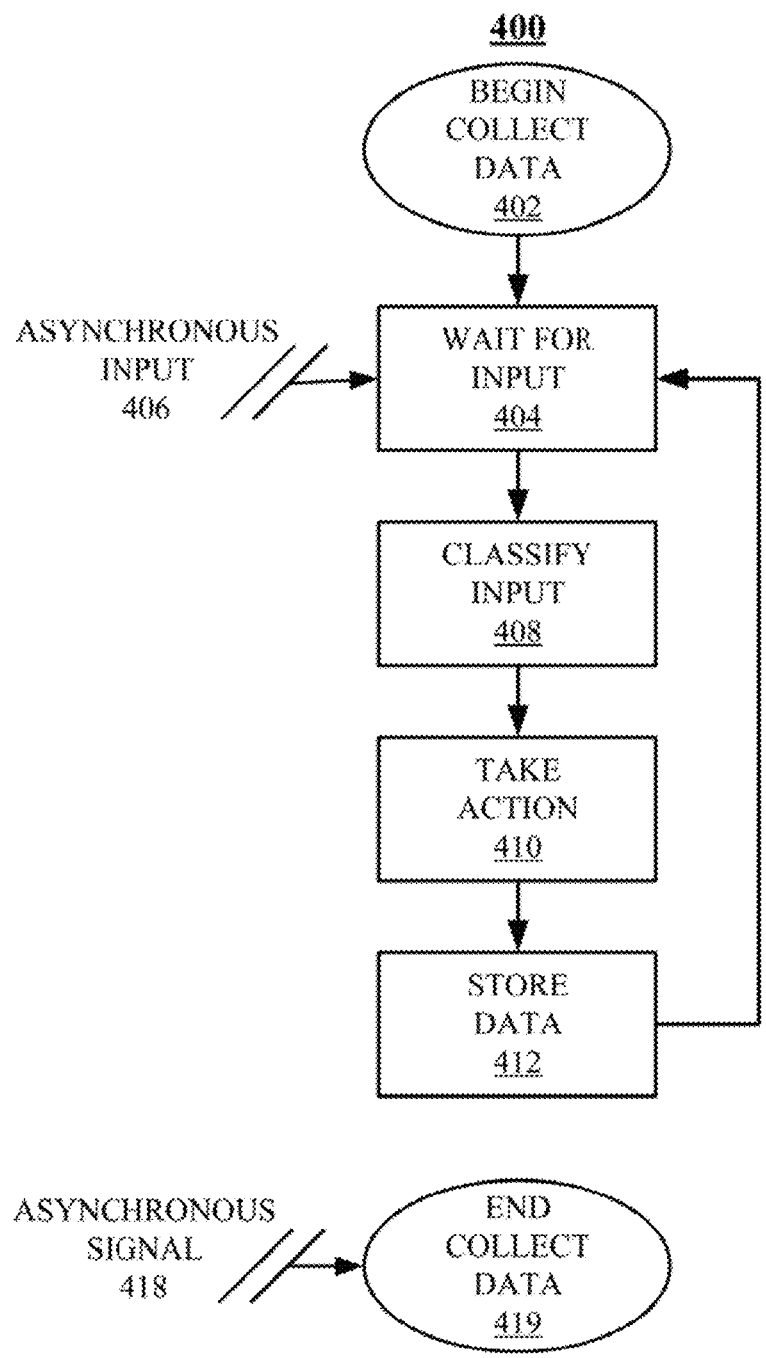
FIG. 7 is a flowchart of an "Collect Data" process that may implement aspects of the claimed subject matter.

FIG. 7 is a flowchart of an "Collect Data" process 400 that may implement aspects of the claimed subject matter. In this example, aspects of process 400 are associated with logic stored on CRSM 112 (FIG. 1) and SCMSM 118 (FIGS. 1 and 2) and executed on one or more processors (not shown) of CPU 104 (FIG. 1) and SCM server 102 (FIG. 1). Other aspects are associated with logic stored on CRSM 132 (FIG. 1) and SCMCM 138 (FIG. 1) and executed on one or more processors (not shown) of CPU 124 (FIG. 1) and client computer 122 (FIG. 1). In short, processing is shared among different elements of computing architecture 100 (FIG. 1).

The specific elements of architecture 100 that perform particular tasks are explained, when necessary, in more detail below.

Process 400 starts in a "Begin Collect Data" block 402 and proceeds immediately to a "Wait for Input" block 404. In this example, user 361 (FIG. 6) is accessing Concept Explorer 360 (FIG. 6) from client computer 122 and the input being waited upon is the interaction of user 361 with SCMCM 132 via browser 136 (FIG. 1). When user 361 generates input an asynchronous input 406 is transmitted to SCMCM 132 and, in response, processing proceeds to a "Classify Input" block 408 (see EDDS 364, FIG. 6). During processing associated with block 408, a determination is made as to exactly the type of input that generated signal 406 and the signal is routed to the appropriate agent for processing (see 366, 368, 370 and 372, FIG. 6) during processing associated with a "Take Action" block 410. For example, a request for a description (see 218, FIG. 3) is routed to document & content management 370 and a request for interaction with another user or an expert (see 324, FIGS. 4 and 6) is routed collaborative service 366.

During processing associated with a "Store Data" block 412, information on the request received during processing associated with block 404 and the action taken during processing associated with block 410 is stored, in this example, by SCMSM 118 (see 144, 164, 166, 168 and 170; FIG. 2). On the data is stored, control returns to block 404 and processing continues as described above.

Finally, process 400 is halted by means of an asynchronous signal 418, which passes control to an "End Collect Data" block 419 in which process 400 is complete. Signal 419 is typically generated when the OS, browser, application, etc. of which process 400 is a part is itself halted. During normal operation, process 400 continuously loops through the blocks 404, 408, 410 and 412, processing input sequences as user 361 generates them.

Figure 8:
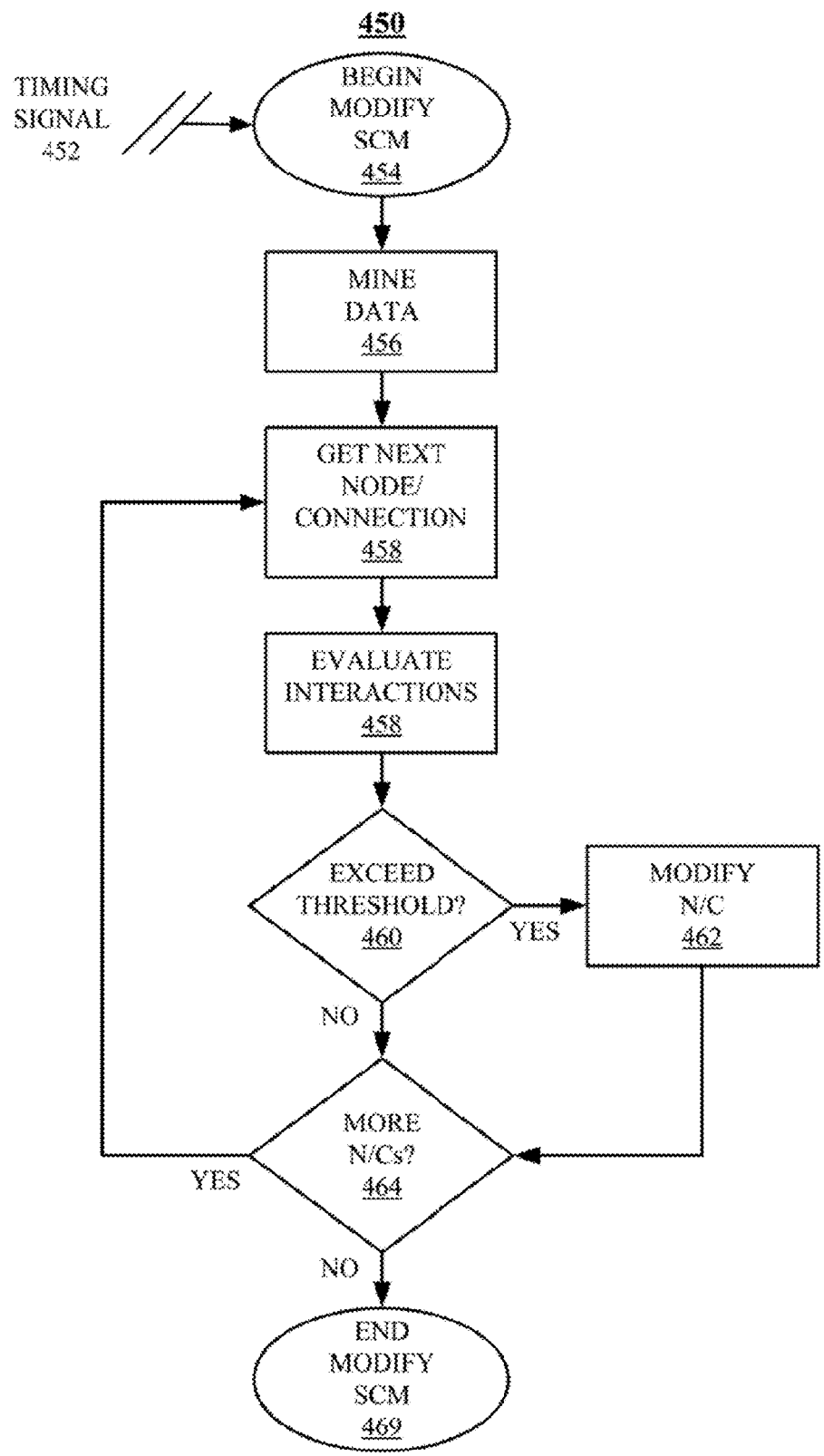
FIG. 8 is a flowchart of an "Modify SCM" process that may implement aspects of the claimed subject matter.

FIG. 8 is a flowchart of an "Modify SCM" process 450 that may implement aspects of the claimed subject matter. In this example process 450 is primarily associated with logic stored on CRSM 112 (FIG. 1) and SCMSM 118 (FIGS. 1 and 2) and executed on one or more processors (not shown) of CPU 104 (FIG. 1) and SCM server 102 (FIG. 1). Aspects of process 450 may be associated with SCMN/SCMB recommendation agent 378 (see FIG. 6). Process 450 is initiated by a periodic timing signal 45. The frequency of timing signal 452 may be adjusted based upon a variable administratively set in operating parameters 162 (FIG. 2). In the alterative, process 450 may be initiated ad hoc by an administrator.

Process 450 starts in a "Begin Modify SCM" block 454 and proceeds immediately to a "Mine Data" block 456. During processing associated with block 456, data collected and stored (see 400, FIG. 7) is mined, or organized, categorized and searched for patterns. As should be familiar to those with skill in the relevant arts, data mining is typically the processing of large amounts of data to generate new information based upon any identified patterns.

Once block 456 is complete, control proceeds to a "Get Next Node/Connection (N/C)" block 458. Although this example uses the modification of nodes and connections, other elements of a SCM, such as in this example SCM 300 (FIG. 4), may be modified as well. During processing associated with block 458, one nose or connection is selected and the data generated during processing associated with block 456 is evaluated to determine as level of interaction with the selected node or connection during processing associated with an "Evaluate Interactions" block 458.

During processing associated with an "Exceed Threshold?" block 460, a determination is made as to whether or not the level of interaction determined during processing associated with block 458 rises to a level that would indicate that a modification of SCM 300 is warranted. Threshold levels may be defined by the setting of variables in operating parameters 162.

If a determination is made that the interactions exceed the threshold level, control proceeds to a "Modify N/C" block 462. During processing associated with block 462, modifications are implemented by modifying the corresponding SCM (see 156, FIG. 2). In addition, to automatic modifications triggered by a positive determination of an exceeded threshold, modifications may be required to be approved and implemented by an administrator.

Once SCM 300 has been modified or, if a determination is made during processing associated with block 460 that a threshold is not exceeded, control proceeds to a "More N/Cs?" block 464. During processing associated with block 464, a determination is made as to whether or not there are more nodes or connections to be processed. If so control returns to block 458, an unprocessed node or connection is selected and processing continues as described above. If not, control proceeds to an "End Modify SCM" block 469 in which process 450 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
   a plurality of processors;
   a non-transitory computer-readable storage medium (CRSM) coupled to the plurality of processors;
   a computer-implemented concept map stored on the CRSM, the concept map comprising:
      a plurality of nodes ($N_1$-Nn);
      a plurality of connections ($C_1$-$C_M$) between the plurality of nodes;
      a plurality of social network connections, wherein each node of the plurality of nodes is coupled to a corresponding subset of the plurality of social network connections; and
      clickable elements comprising the plurality of nodes, the plurality of connections between the plurality of nodes, and the plurality of social network connections; and
   logic, stored on the CRSM and executed on the plurality of processors, for:
      providing a user interface to provide a user access to the concept map, to the plurality of nodes, to the plurality of connections between the nodes, and to the plurality of social network connections;
      collecting data corresponding to navigation of the user of the concept map, the plurality of nodes, and the plurality of connections between the plurality of nodes, and interaction by the user with the plurality of social network connections;
      automatically analyzing the collected data for patterns that improve the concept map's relevance and efficiency, thus improving processing speed and memory usage; and
      automatically modifying, based upon the analyzed data, the concept map and the clickable elements comprising the plurality of nodes and the plurality of connections between the nodes.

2. The apparatus of claim 1, each of the plurality of social network connections comprising one of a group consisting of:
   interaction with one or more peers of the user;
   interaction with one or more experts; and
   access to notes submitted by the one or more peers and the one or more experts.

3. The apparatus of claim 1, each of the plurality of nodes comprising one or more of a group consisting of:
   documents;
   references;
   images;
   expert responses;
   questions; and
   comments by other users.

4. The apparatus of claim 1, the analyzing further comprising a crowd sourcing analytic analysis of the data.

5. The apparatus of claim 1, the analyzing further comprising an administrative analysis of the data.

6. The apparatus of claim 1, the modifying further comprising:
   changing information on the plurality of nodes; and
   changing connections between the plurality of nodes.

7. The apparatus of claim 6, the modifying further comprising:
   administratively reviewing the analysis prior to changing the information and the connections; and
   changing the information and connections only in response to an administrative approval based upon the reviewing.

8. A method for the maintenance and modification of concept maps, comprising:
   storing a computer-implemented concept map stored on a non-transitory computer-readable medium, the concept map comprising:
      a plurality of nodes ($N_1$-Nn);
      a plurality of connections ($C_1$-$C_M$) between the plurality of nodes;
      a plurality of social network connections, within each node of the plurality of nodes is coupled to a corresponding subset of the plurality of social network connections; and
      clickable elements comprising the plurality of nodes, the plurality of connections between the plurality of nodes, and the plurality of social network connections; and
   providing a user interface to provide a user access to the concept map, to the plurality of nodes, to the plurality of connections between the nodes, and to the plurality of social network connections;
   collecting data corresponding to navigation of the user of the concept map, the plurality of nodes, and the plurality of connections between the plurality of nodes, and interaction by the user with the plurality of social network connections;
   automatically analyzing the collected data for patterns that improve the concept map's relevance and efficiency, thus improving processing speed and memory usage; and
   automatically modifying, based upon the analyzed data, the concept map and the clickable elements comprising the plurality of nodes and the plurality of connections between the nodes.

9. The method of claim 8, each of the plurality of social network connections comprising one of a group consisting of:
   interaction with one or more peers of the user;
   interaction with one or more experts; and
   access to notes submitted by the one or more peers and the one or more experts.

10. The method of claim 8, each of the plurality of nodes comprising one or more of a group consisting of:
    documents;
    references;
    images;
    expert responses;
    questions; and
    comments by other users.

11. The method of claim 8, the analyzing further comprising crowd sourcing the data.

12. The method of claim 8, the analyzing further comprising administratively analyzing the data.

13. The apparatus of claim 8, the modifying further comprising:
    changing information on the plurality of nodes; and
    changing connections between the plurality of nodes.

14. The method of claim 13, the modifying further comprising:
    administratively reviewing the analysis prior to changing the information and the connections; and
    changing the information and connections only in response to an administrative approval based upon the reviewing.

15. A computer programming product for the maintenance and modification of concept maps, comprising a non-transitory computer-readable storage medium having program code embodied therewith, the program code executable by a plurality of processors to perform a method comprising:
    storing a computer-implemented concept map stored on a non-transitory computer-readable medium, the concept map comprising:
       a plurality of nodes ($N_1$-Nn);
       a plurality of connections ($C_1$-$C_M$) between the plurality of nodes;
       a plurality of social network connections, within each node of the plurality of nodes is coupled to a corresponding subset of the plurality of social network connections; and
       clickable elements comprising the plurality of nodes, the plurality of connections between the plurality of nodes, and the plurality of social network connections; and
    providing a user interface to provide a user access to the concept map, to the plurality of nodes, to the plurality of connections between the nodes, and to the plurality of social network connections;
    collecting data corresponding to navigation of the user of the concept map, the plurality of nodes, and the plurality of connections between the plurality of nodes, and interaction by the user with the plurality of social network connections;
    automatically analyzing the collected data for patterns that improve the concept map's relevance and efficiency, thus improving processing speed and memory usage; and
    automatically modifying, based upon the analyzed data, the concept map and the clickable elements comprising the plurality of nodes and the plurality of connections between the nodes.

16. The computer programming product of claim 15, each of the plurality of social network connections comprising one of a group consisting of:
    interaction with one or more peers of the user;
    interaction with one or more experts; and
    access to notes submitted by the one or more peers and the one or more experts.

17. The computer programming product of claim 15, each of the plurality of nodes comprising one or more of a group consisting of:
    documents;
    references;
    images;
    expert responses;
    questions; and
    comments by other users.

18. The computer programming product of claim 15, the analyzing further comprising crowd sourcing the data.

19. The computer programming product of claim 15, the analyzing further comprising administratively analyzing the data.

20. The computer programming product of claim 15, the modifying further comprising:
    changing information on the plurality of nodes; and
    changing connections between the plurality of nodes.

* * * * *